United States Patent Office 3,072,674
Patented Jan. 8, 1963

3,072,674
PREPARATION OF VITAMIN $B_{12}$ DERIVATIVES
Konrad Bernhauer, Aschaffenburg, Germany, assignor to Hoffmann-La Roche Inc., Nutley, N.J., a corporation of New Jersey
No Drawing. Filed July 25, 1960, Ser. No. 44,864
Claims priority, application Switzerland July 31, 1959
12 Claims. (Cl. 260—314)

The present invention concerns a process for the preparation of vitamin $B_{12}$ derivatives of the formula

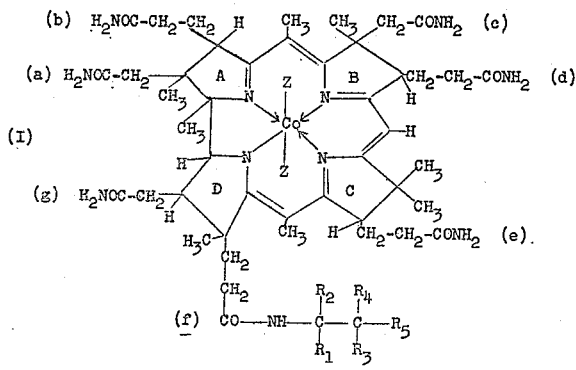

wherein each of the symbols Z represents an anion (for example, the Z's can represent two cyanide ions), the symbol $R_1$ represents a member selected from the group consisting of hydrogen, lower alkyl and lower carbalkoxy radicals, each of the symbols $R_2$, $R_3$ and $R_4$ represents a member selected from the group consisting of hydrogen and lower alkyl radicals, and the symbol $R_5$ represents a member selected from the group consisting of hydroxy, phosphorylated hydroxy, lower alkanoyloxy, benzoyloxy and lower alkoxy.

The free heptacarboxylic acid corresponding to the compounds of Formula I, but wherein none of the carboxyl groups is amidated, is designated "cobyrinic acid" in the following description, and the position of the specific carboxyl groups is shown by the letters (a) to (g) appended to Formula I.

It has been found that compounds of above Formula I can be obtained by condensing cobyrinic acid-*abcdeg*-hexamide with an amine of the formula (II) 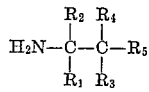

wherein the symbols $R_1$ to $R_5$, inclusive, have the same meaning set forth above with reference to Formula I.

The cobyrinic acid-*abcdeg*-hexamide herein disclosed as a starting material has not hitherto been obtained from vitamin $B_{12}$ by degradation, but it can be obtained upon working up anaerobic digested sludges originating from fermentation wastes, as described below.

16 cubic meters of anaerobic digested sludge obtained from a sewage purification plant in Darmstadt-Eberstadt, Germany, is worked up to a kieselguhr concentrate, in the manner described in German Federal Republic Patent No. 922,126. Upon chromatographic separation of this concentrate on a cellulose column, using n-butanol saturated with water and potassium perchlorate, and containing 0.3 ml. of 10% hydrocyanic acid solution per liter, there is obtained dicyanocobyrinic acid-*abcdeg*-hexamide, intermediate the vitamin $B_{12}$ fraction and the factor III fraction. By concentrating this intermediate fraction in vacuo there is obtained an aqueous concentrate which is purified by extraction with phenol and precipitation with p-chlorophenol on kieselguhr. The thus obtained kieselguhr product is subjected to chromatography on cellulose powder, using n-butanol with 15% water and 0.5 ml. of 10% hydrocyanic acid per liter as eluant. Under these conditions, the $B_{12}$-factors present are eluted in the following sequence: Factor Ib, vitamin $B_{12}$, 5-methylbenzimidazole-cobalamine, benzimidazole-cobalamine, 2-methylmercaptoadenine - cobalamine and factor III. Finally, there is obtained a fraction which travels only slowly and which contains dicyanocobyrinic acid-*abcdeg*-hexamide. This fraction is concentrated in vacuo and subjected to electrophoresis at pH 2.7 in 0.5 N acetic acid with addition of 0.005% HCN. In this procedure, the hexamide migrates to the cathode, whereas the remainder of the above named $B_{12}$-factors do not migrate and thus can be separated. Elution is performed with water, the aqueous solution is purified by extracting with phenol and then evaporating in vacuo. The dry residue is triturated with acetone, the acetone is evaporated and the residue remaining after evaporation of the acetone is dried in vacuo. There is thus obtained a violet-red amorphous non-hygroscopic powder containing dicyanocobyrinic acid-*abcdeg*-hexamide in a purity of over 70%.

The product obtained can be subjected to a further purification treatment by passing a rather concentrated aqueous solution of the substance through a column of phosphorylated cellulose. By this treatment, the hexamide is retained, whereas acidic protein-like impurities are washed out. Thereupon the column is developed with water containing 0.005 to 0.1% HCN. The hexamide is thereby converted to the cyano form and can be directly washed out of the column, whereas basic protein-like impurities remain on the exchanger. The aqueous solution is filtered over kieselguhr, the filtrate is evaporated in vacuo, and the residue is treated with acetone, yielding a violet-red powder in which dicyanocobyrinic acid-*abcdeg*-hexamide is present in a purity of over 90%.

The substance obtained according to the above-described procedure possesses at pH 6.5 in the presence of cyanide ions the same absorption spectrum as dicyanocobyrinic acid-*abcdeg*-hexamide f-isopropanolamide (hereinafter designated cobinamide dicyanide) having a typical maximum at $367\mu$. The $R_f$ values in comparison to those of vitamin $B_{12}$ and cobinamide dicyanide are shown in the following table:

| A | B | C | Developer |
|---|---|---|---|
| 0.68 | 0.54 | 1.0 | a |
| 0.63 | 0.63 | 1.0 | b |
| 1.16 | 0.98 | 1.0 | c |
| 0.43 | 0.36 | 1.0 | d |

A = dicyanocobyrinic acid-*abcdeg*-hexamide
B = cobinamide dicyanide
C = vitamin $B_{12}$
a = sec. butanol saturated with water
b = a with addition of ammonia
c = a with addition of acetic acid
d = a with 0.5% sodium tetraphenylborate Development was effected for 24 hours at room temperature, ascending, on Schleicher and Schull paper 2043A, the developer always containing cyanide ions.

The paper-electrophoretic behavior in the presence of cyanide ions is: at pH 2.7 basic (like cobinamide dicyanide) (orange), and pH 6.5 monoacidic (violet).

As the second reactant in the processes of the invention, there can be employed amines having free hydroxyl groups, e.g. aminoethanol, 1-amino-2-propanol, 2-amino-1-propanol, 3-amino-2-butanol, amino-tert. butanol, and the like. In lieu of the amino alcohols, one can also employ derivatives thereof in which the hydroxyl group has been blocked by ether or ester formation. Appropriate for this purpose are e.g. alkyl, aralkyl and tetrahydropyranyl ethers. One can also employ amino alcohols esterified by organic acids, e.g. acetates or benzoates. Likewise, one can employ derivatives of the amino alcohols in which the hydroxyl group has been esterified with other acids, e.g. hydrochloric acid, hydrobromic acid, hydriodic acid, phosphoric acid, dialkyl-phosphoric acids, diaryl-phosphoric acids, diaralkyl-phosphoric acids, sulfuric acid, methylsulfonic acid, arylsulfonic acids and the like. Exemplary of such derivatives are aminoethyl chloride, 1-amino-2-propyl bromide, 1-amino-2-propyl iodide, aminoethyl - O - phosphate, 1-amino-2-propanol-O-phosphate, 1-amino-2-propanol-O-diphenyl phosphate, 1-amino-2-ethanol-O-methyl phosphate, 1-amino-2-propanol-O-tosylate. If it should be desired to make an end product of above Formula I wherein $R_1$ signifies a carbalkoxy group, it is appropriate to employ amino acid esters as the amine component, e.g. esters of serine and threonine and derivatives thereof. After reaction of the amino acid ester with cobyrinic-*abcdeg*-hexamide, the carbalkoxy group can be split off by hydrolysis and decarboxylation. As the amine component, one can employ, as in the case of the amino alcohols, also amino acid esters having an esterified or etherified hydroxyl group. As examples, the following compounds are mentioned: serine-methyl ester-O-methyl ether, serine-methyl ester-O-dibenzyl phosphate, serine ethyl ester-O-phosphate, threonine-methyl ester-O-benzyl ether, threonine-ethyl ester-O-benzoate.

All of these amino alcohols and their derivatives can be employed for the processes of the invention either in optically active form or in the form of their racemates.

A preferred mode of execution of the processes of the invention comprises converting the *abcdeg*-hexamide-*f*-acid to a reactive derivative and condensing the latter with the amine reactant. Reactive derivatives include, for example, esters such as the methyl ester and the ethyl ester, and the so-called activated esters such as cyanomethyl esters or thiol esters. Particularly suitable are also anhydrides, e.g. mixed anhydrides, which can be obtained by reaction of the acid with chlorocarbonic (chloroformic) acid esters in the presence of a tertiary base.

An especially appropriate mode of execution of the processes of the invention comprise effecting the condensation in the presence of a carbodiimide. Aromatic, aliphatic and cyclo-aliphatic representatives of the latter class of compounds can be employed, e.g. p-ditolylcarbodiimide, di-tert. butylcarbodiimide and dicyclohexylcarbodiimide. When employing a carbodiimide, the preparation of a reactive derivative of the acid is unnecessary and moreover the reaction can be effected in water or in water-containing solvent media in which the acid employed as starting material is soluble.

As solvent media for carrying out processes of the invention, one can employ water and water-miscible solvents such as acetone, dioxane, tetrahydrofuran, formamide, dimethylformamide and lower alkanols, e.g. methanol, ethanol and isopropanol. Also, particularly suitable are chlorinated hydrocarbons, e.g. methylene chloride and chloroform, as well as aromatic hydrocarbons, e.g. benzene and toluene. Additional suitable solvents include, for example, pyridine and its homologs, e.g. lutidine, which can be employed in admixture with water and also with the other solvents mentioned above.

In view of the sensitivity of the starting materials and the end products, it is advantageous to avoid high temperatures during the condensation. Accordingly it is recommended to effect the reaction at room temperature or with cooling; however, in appropriate instances, a moderately elevated temperature can be employed. In the case of reaction of an ester with an amine, refluxing in a solvent can be used to advantage.

Moreover, it is often advantageous to effect the processes of the invention in the presence of acidic or basic catalysts. Such catalysts include, for example, alkoxides such as sodium methylate, mineral acids such as hydrochloric acid, or organic acids such as p-toluenesulfonic acid. It is also appropriate to effect the reaction in the presence of materials which take up the water formed by reaction, such as acetic anhydride, calcium chloride and sodium sulfate.

The isolation and purification of the end products of the reaction can be effected by chromatographic procedures or by electrophoresis, whereby the separation of unreacted material can be effected in an especially simple manner. Purification can also be effected by fractional precipitation using appropriate solvent mixtures, e.g. water/acetone.

The end products of the processes of the invention include products useful as growth-promoting materials for micro-organisms, such as coli bacteria; for example, dicyanocobyrinic acid-*abcdeg*-hexamide-*f*-(D - 2 - hydroxypropyl)amide (factor B). They also include products which exhibit anti-vitamin $B_{12}$ activity, and compounds useful for the synthesis of complete vitamins of the $B_{12}$ group. Particularly important are those end products wherein the carboxy group in *f*-position is amidated by aminoisopropanol, inasmuch as aminoisopropanol is the bridge, in complete vitamins of the $B_{12}$-group, between the macrocyclic cobalt complex and the nucleotide.

The invention is further disclosed in the following examples, which are illustrative but not limitative thereof.

*Example 1*

To a solution of 5.42 mg. ($5.5 \times 10^{-6}$ mol) of dicyanocobyrinic acid-*abcdeg*-hexamide (dried over $P_2O_5$ at 110° C. and 0.1 mm. Hg) in 2.0 ml. of absolute dimethylformamide is added 0.011 ml. ($1.1 \times 10^{-5}$ mol) of a 1-molar triethylamine solution in dimethylformamide. The mixture is cooled to minus 10° C. and then 0.005 ml. ($5.0 \times 10^{-6}$ mol) of a 1-molar solution of chloroformic acid ethyl ester in dimethylformamide is added. The reaction mixture is allowed to stand for 20 minutes at minus 10° C. and then is reacted in the cold with 7.5 mg. ($1 \times 10^{-4}$ mol) of D,L-1-amino-2-propanol. The mixture is shaken several times and then is brought to room temperature over a period of 30 minutes and thereupon heated for one hour at 40° C. in a water bath. The solution is mixed with 4 ml. of acetone and 8 ml. of diisopropyl ether; the red precipitate is extracted twice, each time with 5 ml. of acetone; dissolved in 5 ml. of water; and purified by use of a phosphorylated cellulose exchanger. The cyanide-containing fraction is then concentrated in vacuo to a volume of 1 ml.

0.05 ml. of the thus obtained solution is put on Schleicher and Schull paper 2043bG1 and subjected to electrophoresis, in a phosphate buffer and in the presence of cyanide ions, at pH 6.5 for 15 hours at 150 volts. By far the largest amount of material remains in the neutral zone, and only a small portion migrates as a monobasic acid. The neutral zone is cut out, eluted with water, and desalted by means of a phosphorylated cellulose exchanger. In this way there is obtained in 92% yield the racemate of cobinamide dicyanide.

*Example 2*

5.0 mg. ($5.1 \times 10^{-6}$ mol) of dicyanocobyrinic acid-*abcdeg*-hexamide is dissolved in 0.1 ml. of water and 0.9 ml. of pyridine, mixed with 7.5 mg. ($1 \times 10^{-4}$ mol) of D,L-1-amino-2-propanol and to this mixture at room temperature is added a solution of 3.84 mg. ($2 \times 10^{-5}$ mol) of dicyclohexylcarbodiimide in 1 ml. of pyridine. To the clear solution obtained after standing at room temperature for 18 hours is added 2 ml. of water; the precipitated N,N'-dicyclohexylurea is filtered off; the filtrate is extracted five times, each time with 1 ml. of ether; and the aqueous phase is brought to pH 4.5 with 1 N acetic acid. The newly formed precipitate is centrifuged off and the aqueous phase is concentrated in vacuo to a volume of 1 ml. Purification is effected in the manner indicated in Example 1. There is thus obtained the racemate of cobinamide dicyanide in a yield of 22.5%.

The above described reaction can be carried out in a similar manner with D-1-amino-2-propanol or L-1-amino-2-propanol in lieu of D,L-1-amino-2-propanol.

*Example 3*

To a solution of 9.85 mg. ($1 \times 10^{-5}$ mol) of dicyanocobyrinic acid-*abcdeg*-hexamide in 4.0 ml. of absolute dimethylformamide and 0.02 ml. ($2 \times 10^{-5}$ mol) of a 1-molar triethylamine solution in dimethylformamide is introduced, while cooling at minus 10° C., 0.011 ml. ($1.1 \times 10^{-5}$ mol) of chloroformic acid ethyl ester (1-molar solution in dimethylformamide). After standing for 20 minutes at minus 10° C. the reaction mixture is mixed with 12.2 mg. ($2 \times 10^{-4}$ mol) of 1-amino-2-ethanol, the reaction mixture is brought to room temperature over a period of 30 minutes while being shaken from time to time, and then is heated for one hour at 40° C. on a water bath. The reaction product is precipitated with a mixture of 6 ml. of acetone and 14 ml. of diisopropyl ether; centrifuged; the residue is washed twice, each time with 8 ml. of acetone; dissolved in 1 ml. of water; and precipitated by acetone/ether onto 15 g. of kieselguhr. The kieselguhr product is dried over magnesium perchlorate in vacuo at room temperature.

The kieselguhr product is chromatographed on a cellulose column (linter powder No. 124 of the firm Schleicher and Schull; the column being 3 x 20 cm.), using water-saturated secondary butanol as the developer. Three sharp zones are formed, the first two zones being eluted rather quickly. The last zone is taken out of the column and eluted with water. The thus obtained three fractions are concentrated in vacuo to an end volume of 1 ml. each. Fraction 1 contains 86%, fraction, 2, 6%, and fraction 3, 4% of reaction product; calculated upon dicyanocobyrinic acid-*abcdeg*-hexamide starting material.

The following table shows the paper-chromatographic behavior of the individual fractions in various developer systems, development being effected on Schleicher and Schull paper 2043A, ascending with a development period of 20 hours:

| Developer | Fraction 1 R$_f$-values | Fraction 2 (cobinamide dicyanide=) | Fraction 3 |
|---|---|---|---|
| a | 0.96 | 1.03 | 0.54 |
| b | 0.95 | 0.86 | 0.63 |
| c | 0.97 | 1.04 | 0.95 |
| d | 0.95 | 1.03 | 0.35 | a=water-saturated secondary butanol
b=a with an addition of ammonia
c=a with addition of acetic acid
d=a with 0.5% sodium tetraphenyl borate The following table shows the electrophoretic behavior of the individual fractions in the presence of cyanide ions:

| | pH 2.7 | pH 6.5 |
|---|---|---|
| Fraction 1 | basic | neutral. |
| Fraction 2 | basic | neutral. |
| Fraction 3 | basic | acid. |

Fraction 1 contains dicyanocobyrinic acid-*abcdeg*-hexamide-*f*-ethanolamide, fraction 2 the corresponding monoethyl carbonic acid ester, and fraction 3 dicyanocobyrinic acid-*abcdeg*-hexamide.

*Example 4*

1.97 mg. ($2 \times 10^{-6}$ mol) of dicyanocobyrinic acid-*abcdeg*-hexamide, dissolved in 0.2 ml. of water and 0.3 ml. of methanol, is reacted at room temperature with 1 ml. ($6 \times 10^{-4}$ mol) of diazomethane dissolved in ether. The ethereal diazomethane solution is added in portions each of 0.1 ml., and in each instance after the ether layer of the reaction mixture has become colorless. After one hour the evolution of gas has ceased. The mixture is allowed to stand overnight; then it is extracted three times, each time with 2 ml. of ether; and the aqueous phase is purified with a phosphorylated cellulose exchanger. The fraction containing cyanide ions is concentrated to 0.5 ml., and separated electrophoretically at pH 6.5 in the presence of cyanide ions, at 200 volts. Two zones are formed. Fraction 1 migrates as a monobasic acid and is identical with the starting material, 52% of which is recovered. Fraction 2 reacts neutral, analogously to cobinamide dicyanide, and is obtained in a yield of 25%. After desalting with an ion exchanger, the substance behaves homogeneously in all developer systems, and has the following paper chromatographic behavior:

| Developer | R$_f$ | R$_f$ Cobinamide dicyanide=1 |
|---|---|---|
| a | 0.43 | 1.07 |
| b | 0.36 | 0.88 |
| c | 0.44 | 1.09 |
| d | 0.46 | 1.05 | a = water saturated secondary butanol
b=a with an addition of ammonia
c=a with addition of acetic acid
d=a with 0.5% sodium tetraphenyl borate The electrophoretic behavior of fraction 2 in the presence of cyanide ions is basic at pH 2.7, and neutral at pH 6.5 and pH 11.

0.4 mg. ($2 \times 10^{-7}$ mol) of fraction 2, containing dicyanocobyrinic acid-*abcdeg*-hexamide methyl ester, is dried over phosphorus pentoxide at 50° C. and 0.1 mm. Hg, then dissolved in 1 ml. of absolute dimethylformamide and reacted with 1.5 mg. ($2 \times 10^{-5}$ mol) of D,L-1-amino-2-propanol. The reaction mixture is kept at 25° C. for four days, precipitated with acetone/diisopropyl ether, washed three times with acetone, dissolved in water and purified with a phosphorylose cellu'ose exchanger. The aqueous eluate containing cyanide ions is concentrated to 0.2 ml. and separated on Schleicher and Schull paper 2043A using water-saturated secondary butanol with addition of ammonia as the developer. Cobinamide dicyanide is obtained in a yield of 9%.

*Example 5*

To a solution of 5.42 mg. ($5.5 \times 10^{-6}$ mol) of dicyanocobyrinic acid-*abcdeg*-hexamide in 2.0 ml. of absolute dimethylformamide is added 0.011 ml. ($1.1 \times 10^{-5}$ mol) of a 1-molar triethylamine solution in dimethylformamide. The reaction mixture is cooled to minus 10° C. and then 0.005 ml. ($5.0 \times 10^{-6}$ mol) of a 1-molar solution of chloroformic acid ethyl ester in dimethylformamide is added. The reaction mixture is allowed to stand 20 minutes at minus 10° C. and then reacted in the cold with 31.0 mg. ($2 \times 10^{-4}$ mol) of D,L-1-amino-2-propanol-O-phosphate dissolved in 0.4 ml. of 1 N sodium hydroxide solution ($4 \times 10^{-4}$ mol). The reaction mixture is brought to room temperature over a period of 30 minutes while shaking vigorously, and then is heated at 30° C. on a water bath for 3 hours. The solution is mixed with acetone/diisopropyl ether, the resulting precipitate is washed twice with acetone, dissolved in 5 ml. of water and set to pH 6 with 1 N acetic acid. The thus obtained aqueous solution is separated with phosphorylated cellulose exchanger (in a column 2 x 20 cm.). Two fractions are formed. Fraction 1 is obtained by eluting with 250 ml. of water and concentrating to a final volume of 2 ml. at 20° C. in vacuo. Fraction 2 is obtained by eluting with 300 ml. of 0.1% hydrocyanic acid and concentrating to 2 ml.

Fraction 1 is purified electrophoretically at pH 2.7 in the presence of cyanide ions at 300 volts in a period of 4 hours. The largest portion thereby remains at the starting line (neutral) and only a small portion migrates to the cathode, practically the same as dicyanocobyrinic acid-*abcdeg*-hexamide. The neutral zone is eluted with water and analyzed. Cobinamide phosphate dicyanide is obtained in a yield of 47%.

*Example 6*

5.42 mg. ($5.5 \times 10^{-6}$ mol) of dicyanocobyrinic acid-*abcdeg*-hexamide is converted to the mixed anhydride in the manner described in Example 3; then is reacted with 28.2 mg. ($2 \times 10^{-4}$ mol) of 1-amino-2-ethanol-O-phosphate dissolved in 0.8 ml. of pyridine and 0.2 ml. of water, in the manner described in Example 3; and the reaction mixture is then worked up. There is obtained dicyanocobyrinic acid-*abcdeg*-hexamide-*f*-[ethanolamide-O-phosphate] in a yield of 62%.

*Example 7*

$8 \times 10^{-6}$ mol of dicyanocobyrinic acid-*abcdeg*-hexamide is converted to the mixed anhydride in the manner described in Example 1. The thus obtained reaction mixture is reacted at minus 10° C. with an aqueous solution of $16 \times 10^{-6}$ mol of serine methyl ester, and worked up in the manner indicated in Example 1. The cobalamine precipitated by acetone and ether is taken up in absolute methanol and separated electrophoretically at pH 6.5 for 20 hours. The neutral portion of material is cut out of the paper, eluted and further purified by precipitation with p-chlorophenol. Then the aqueous solution of the thus obtained product is adsorbed on a column of phosphorylated cellulose and again eluted with 0.1% hydrocyanic acid solution and dried in vacuo. The thus purified preparation contains 7.74% of water. The cobalt content per milligram of material amounts to 0.045 mg., the serine content to 0.081 mg. The proportion of cobalt:serine is 1:1.01.

The dicyanocobyrinic acid-*abcdeg*-hexamide-*f*-(L-2-hydroxy-1-methoxycarbonylethylamide) behaves basically upon electrophoresis at pH 2.7, neutral at pH 6.5, and at pH 10.7 the substance is destroyed.

*Example 8*

Under the same reaction conditions as in Example 7, but substituting threonine methyl ester in lieu of serine methyl ester there is obtained dicyanocobyrinic acid-*abcdeg*-hexamide-*f*-(L - 2-hydroxy-1 - methoxycarbonylpropylamide) which in all physical and chemical characteristics behaves like the preparation described in Example 7.

I claim:
1. A process for the preparation of vitamin $B_{12}$ derivatives which comprises reacting cobyrinic acid-*abcdeg*-hexamide with an amine of the formula

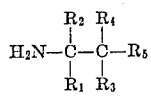

wherein the symbol $R_1$ represents a member selected from the group consisting of hydrogen, lower alkyl and lower carbalkoxy, each of the symbols $R_2$, $R_3$ and $R_4$ represents a member selected from the group consisting of hydrogen and lower alkyl, and the symbol $R_5$ represents a member selected from the group consisting of hydroxy, phosphorylated hydroxy, lower alkanoyloxy, benzoyloxy and lower alkoxy.

2. A process according to claim 1 wherein the amine is aminoisopropanol.
3. A process according to claim 1 wherein the amine is aminoisopropanol-O-phosphate.
4. A process according to claim 1 wherein the cobyrinic acid-*abcdeg*-hexamide is converted via treatment with chloroformic acid lower alkyl ester in dimethylformamide in the presence of triethylamine to a mixed anhydride thereof with carbonic acid mono (lower alkyl) ester prior to the step of condensation with the amine.
5. A process according to claim 1 wherein the cobyrinic acid-*abcdeg*-hexamide is converted via treatment with diazomethane to a methyl ester thereof prior to the step of condensation with the amine.
6. A process according to claim 1 wherein the condensation is effected in the presence of a carbodiimide selected from the group consisting of diaryl-carbodiimide, dialkyl-carbodiimide and dicycloalkyl carbodiimide.
7. Mixed anhydride of cobyrinic acid-*abcdeg*-hexamide with carbonic acid mono(lower alkyl) ester.
8. Cobyrinic acid-*abcdeg*-hexamide lower alkyl ester.
9. Cobyrinic acid-*abcdeg*-hexamide-*f*-(2-hydroxyethylamide).
10. Cobyrinic acid-*abcdeg*-hexamide-*f*-(1-lower alkoxycarbonyl-2-hydroxyethylamide).
11. Cobyrinic acid-*abcdeg*-hexamide-*f*-(1-methoxycarbonyl-2-hydroxyethylamide).
12. Cobyrinic acid-*abcdeg*-hexamide-*f*-(2-hydroxyethylamide-O-phosphate).

References Cited in the file of this patent
FOREIGN PATENTS
407,486      Great Britain _____ Mar. 22, 1934

OTHER REFERENCES

Cannon et al.: Nature (London), vol. 174 (Dec. 25, 1954), pp. 1168, 1169.

Hodgkin et al.: Proc. Roy. Soc. London, Ser. A, vol. 242 (Nov. 19, 1957), pp. 230 and 257–261.

UNITED STATES PATENT OFFICE
CERTIFICATE OF CORRECTION

Patent No. 3,072,674                      January 8, 1963

Konrad Bernhauer

It is hereby certified that error appears in the above numbered patent requiring correction and that the said Letters Patent should read as corrected below.

Column 5, line 45, for "(cobinamide dicyanide=) read -- (cobinamide dicyanide=1) --.

Signed and sealed this 12th day of November 1963.

SEAL)
Attest:

ERNEST W. SWIDER

Attesting Officer

EDWIN L. REYNOLDS

Acting Commissioner of Patents